US009680746B2

(12) United States Patent
DeCusatis et al.

(10) Patent No.: US 9,680,746 B2
(45) Date of Patent: Jun. 13, 2017

(54) SOURCE ROUTING WITH FABRIC SWITCHES IN AN ETHERNET FABRIC NETWORK

(71) Applicant: International Business Machines Corporation, Armonk, NY (US)

(72) Inventors: Casimer M. DeCusatis, Poughkeepsie, NY (US); Mircea Gusat, Langnau (CH); Keshav G. Kamble, Fremont, CA (US); Cyriel J. Minkenberg, Gutenswil (CH); Vijoy A. Pandey, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/987,719

(22) Filed: Jan. 4, 2016

(65) Prior Publication Data
US 2016/0119236 A1    Apr. 28, 2016

Related U.S. Application Data

(63) Continuation of application No. 13/781,561, filed on Feb. 28, 2013.

(51) Int. Cl.
*H04L 12/66* (2006.01)
*H04L 12/741* (2013.01)
(Continued)

(52) U.S. Cl.
CPC ............ *H04L 45/745* (2013.01); *H04L 45/34* (2013.01); *H04L 45/54* (2013.01); *H04L 45/72* (2013.01);
(Continued)

(58) Field of Classification Search
CPC ....................................................... H04L 12/56
(Continued)

(56) References Cited

U.S. PATENT DOCUMENTS

| 8,111,618 B2 | 2/2012 | Li et al. |
| 8,341,291 B2 | 12/2012 | Twitchell, Jr. |

(Continued)

FOREIGN PATENT DOCUMENTS

| CN | 101471841 A | 7/2009 |
| WO | 2012137646 A1 | 10/2012 |

OTHER PUBLICATIONS

Decusatis et al., U.S Appl. No. 13/781,561, filed Feb. 28, 2013.
(Continued)

*Primary Examiner* — Shripal Khajuria
(74) *Attorney, Agent, or Firm* — Zilka-Kotab, P.C.

(57) ABSTRACT

In one embodiment, a computer program product includes a computer readable storage medium having program instructions embodied therewith. The embodied program instructions are readable/executable by a processor to receive, by the processor, a packet via a network fabric, the network fabric having a plurality of interconnected fabric switches. The embodied program instructions are also readable/executable by the processor to determine, by the processor, a path through the network fabric by consulting a source-routing table. Moreover, the embodied program instructions are readable/executable by the processor to store, by the processor, source-routing information to a packet header for the packet, the source-routing information including the path. In addition, the embodied program instructions are readable/executable by the processor to send, by the processor, the packet according to an indication in the source-routing information.

17 Claims, 7 Drawing Sheets

(51) Int. Cl.
*H04L 12/947* (2013.01)
*H04L 12/931* (2013.01)
*H04L 12/721* (2013.01)
*H04L 12/801* (2013.01)

(52) U.S. Cl.
CPC .............. *H04L 47/12* (2013.01); *H04L 49/25* (2013.01); *H04L 49/351* (2013.01)

(58) Field of Classification Search
USPC .......................................................... 370/355
See application file for complete search history.

(56) References Cited

U.S. PATENT DOCUMENTS

| | | |
|---|---|---|
| 9,270,618 B2 | 2/2016 | DeCusatis et al. |
| 2003/0033427 A1 | 2/2003 | Brahmaroutu |
| 2005/0129022 A1 | 6/2005 | Mugica et al. |
| 2009/0034419 A1 | 2/2009 | Flammer, III et al. |
| 2011/0273980 A1 | 11/2011 | Ashwood Smith |
| 2011/0317559 A1 | 12/2011 | Kern et al. |
| 2012/0099591 A1 | 4/2012 | Kotha et al. |
| 2012/0207165 A1 | 8/2012 | Davis |
| 2012/0250682 A1 | 10/2012 | Vincent et al. |
| 2014/0022894 A1 | 1/2014 | Oikawa et al. |
| 2014/0241345 A1 | 8/2014 | DeCusatis et al. |

OTHER PUBLICATIONS

Restriction Requirement from U.S. Appl. No. 13/781,561, dated Feb. 4, 2015.
Non-Final Office Action from U.S Appl. No. 13/781,561, dated Mar. 26, 2015.
Final Office Action from U.S. Appl. No. 13/781,561, dated Jul. 20, 2015.
Notice of Allowance from U.S. Appl. No. 13/781,561, dated Sep. 29, 2015.
International Search Report from PCT Application No. PCT/IB2014/058659, dated Jun. 5, 2014.

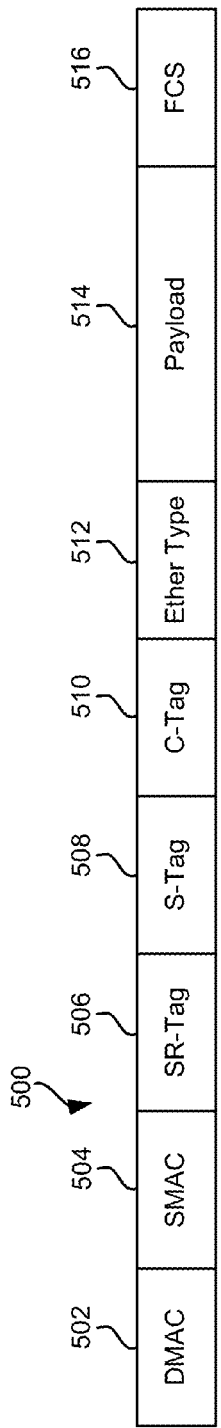
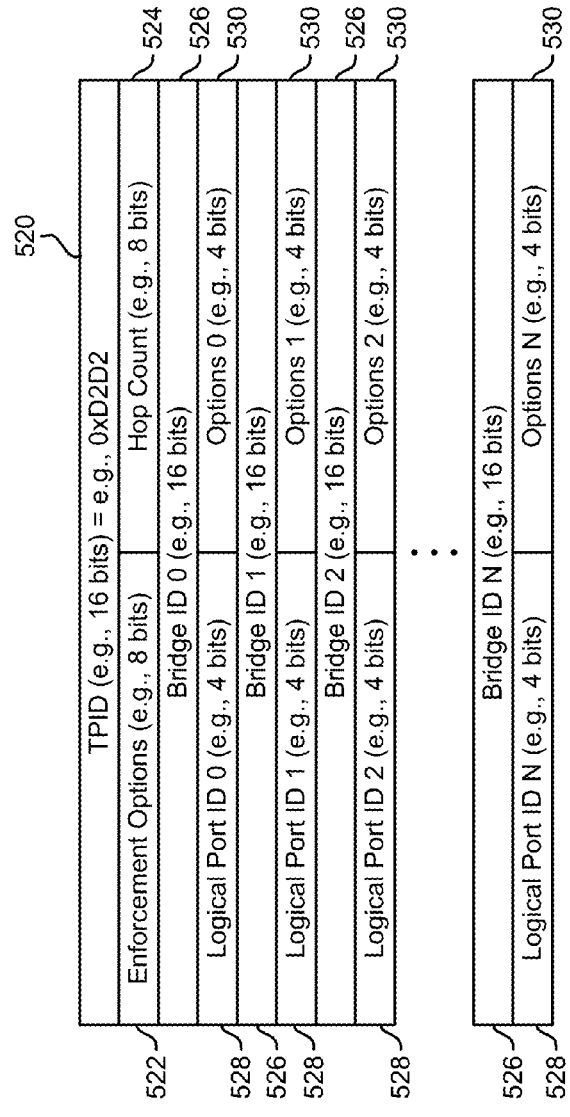
FIG. 5A
FIG. 5B

US 9,680,746 B2

SOURCE ROUTING WITH FABRIC SWITCHES IN AN ETHERNET FABRIC NETWORK

BACKGROUND

The present invention relates to data center infrastructure, and more particularly, this invention relates to reducing the overhead associated with using look-up tables in fabric switches to reduce latency.

A switching processor, such as a switching application specific integrated circuit (ASIC), may be used to choose a port to send received network packets. Typically, a look-up table is utilized to choose which port to send a received packet based on a destination address designated in a header of the received packet. However, as fabric networks grow larger, these look-up tables may encompass vast amounts of data, which causes latency in using the look-up table to determine an egress port to forward packets to. Accordingly, it would be beneficial to have a method to reduce the overhead associated with using look-up tables in fabric switches in order to reduce fabric latency.

SUMMARY

In one embodiment, a system includes a processor and logic integrated with and/or executable by the processor. The logic is configured to receive a packet via a network fabric, the network fabric having a plurality of interconnected fabric switches. The logic is also configured to determine a path through the network fabric by consulting a source-routing table. Moreover, logic is configured to store source-routing information to a packet header for the packet, the source-routing information including the path. Also, logic is configured to send the packet according to an indication in the source-routing information.

According to another embodiment, a computer program product includes a computer readable storage medium having program instructions embodied therewith. The embodied program instructions are readable/executable by a processor to receive, by the processor, a packet via a network fabric, the network fabric having a plurality of interconnected fabric switches. The embodied program instructions are also readable/executable by the processor to determine, by the processor, a path through the network fabric by consulting a source-routing table. Moreover, the embodied program instructions are readable/executable by the processor to store, by the processor, source-routing information to a packet header for the packet, the source-routing information including the path. In addition, the embodied program instructions are readable/executable by the processor to send, by the processor, the packet according to an indication in the source-routing information.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5A shows a frame format for an exemplary packet, according to one embodiment.

FIG. 5B is an exemplary tag protocol identifier, according to one embodiment.

DETAILED DESCRIPTION

Figure 1:
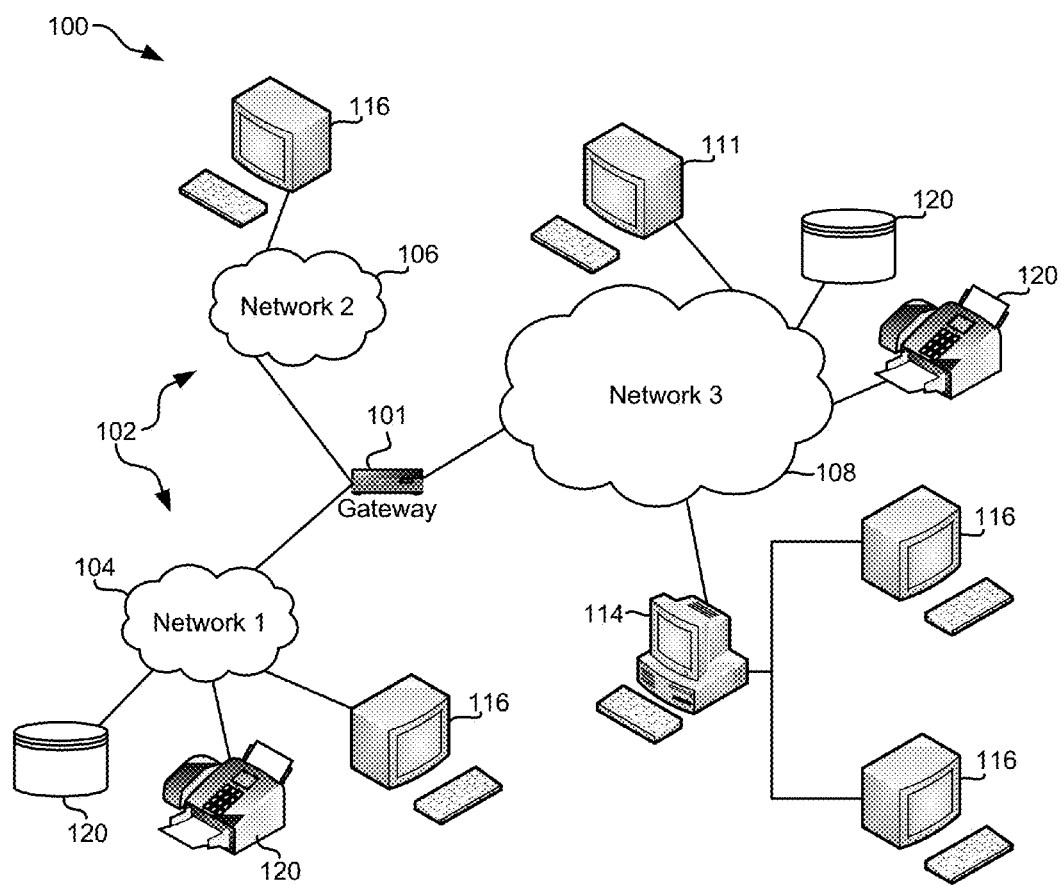
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system for source routing packets includes a network fabric having a plurality of fabric switches interconnected in the network fabric and a switch controller having logic adapted to configure the network fabric, determine one or more paths through the network fabric between any two hosts connected thereto, and create a source-routing table to store the one or more paths through the network fabric between any two hosts connected thereto.

According to another general embodiment, a computer program product for source routing packets includes a computer readable storage medium having program code embodied therewith, the program code readable/executable by a switch controller to: configure a network fabric having a plurality of fabric switches interconnected in the network fabric, determine one or more paths through the network fabric between any two hosts connected thereto, and create a source-routing table to store the one or more paths through the network fabric between any two hosts connected thereto.

In another general embodiment, a method for source routing packets includes receiving or creating a packet using a network interface card (NIC) of a host connected to a network fabric having a plurality of fabric switches interconnected therein, determining a path through the network fabric by consulting a source-routing table stored to the host, storing source-routing information to a packet header for the packet, the source-routing information including the path, and sending the packet to a first device or hop indicated by the path in the source-routing information.

In yet another general embodiment, a method for source routing packets includes receiving a packet, receiving source-routing information with a fabric switch interconnected to other fabric switches in a network fabric, the source-routing information being sent from a switch controller, storing the source-routing information to a source-routing table that indicates a sequence of devices or hops between the fabric switch and each known destination address in the network fabric, determining a next device or hop in a path through the network fabric by consulting the source-routing table, storing a portion of the source-routing information to a packet header for the packet, the portion of the source-routing information including at least a portion of the path, and sending the packet to the next device or hop indicated by the at least the portion of the path in the portion of the source-routing information.

By using a switch controller, such as a controller operating OpenFlow software (an OpenFlow Controller) or a switch controller that operates according to software-defined network (SDN) standards, a plurality of switches in a network fabric which are capable of communicating with the switch controller may be instructed of desirable paths with which to forward received packets in order to best utilize the network fabric. To accomplish this, intelligence or functionality may be built into the switch controller to determine paths through the network fabric and to deliver these desired paths to individual switches in the network fabric that are compliant with whatever software the switch controller utilizes. In addition, in one approach, when the switch controller operates according to OpenFlow and/or SDN standards, the switches may be OpenFlow and/or SDN compliant in order to utilize the source routing techniques described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, a system, apparatus, device, or any suitable combination of the foregoing which may rely on any suitable technology types, such as electronic, magnetic, optical, electromagnetic, infrared, semiconductor, etc. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
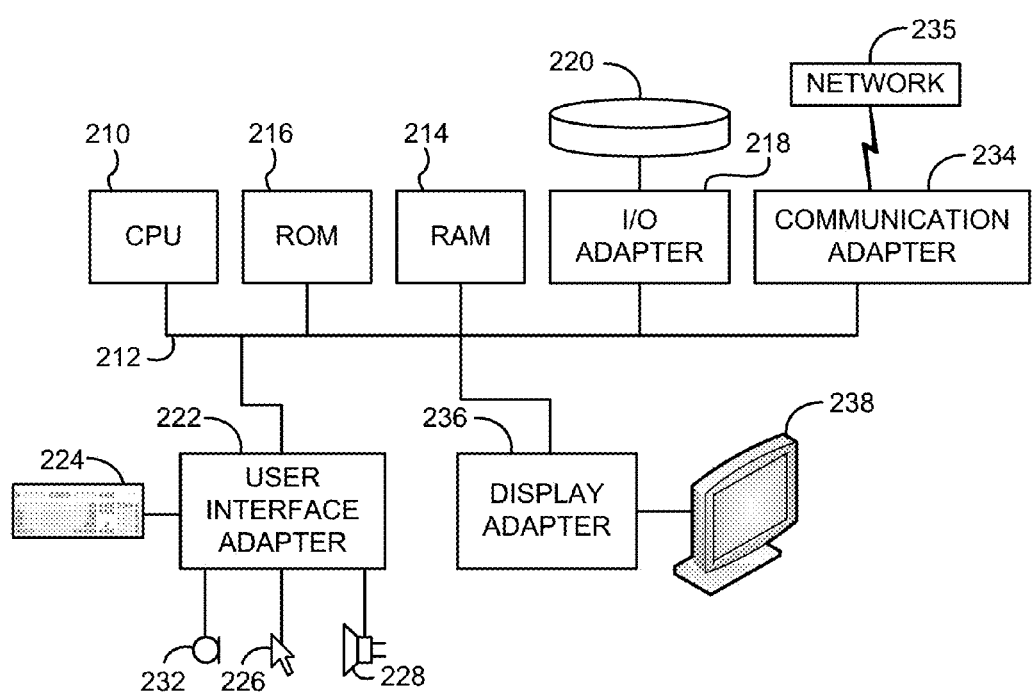
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
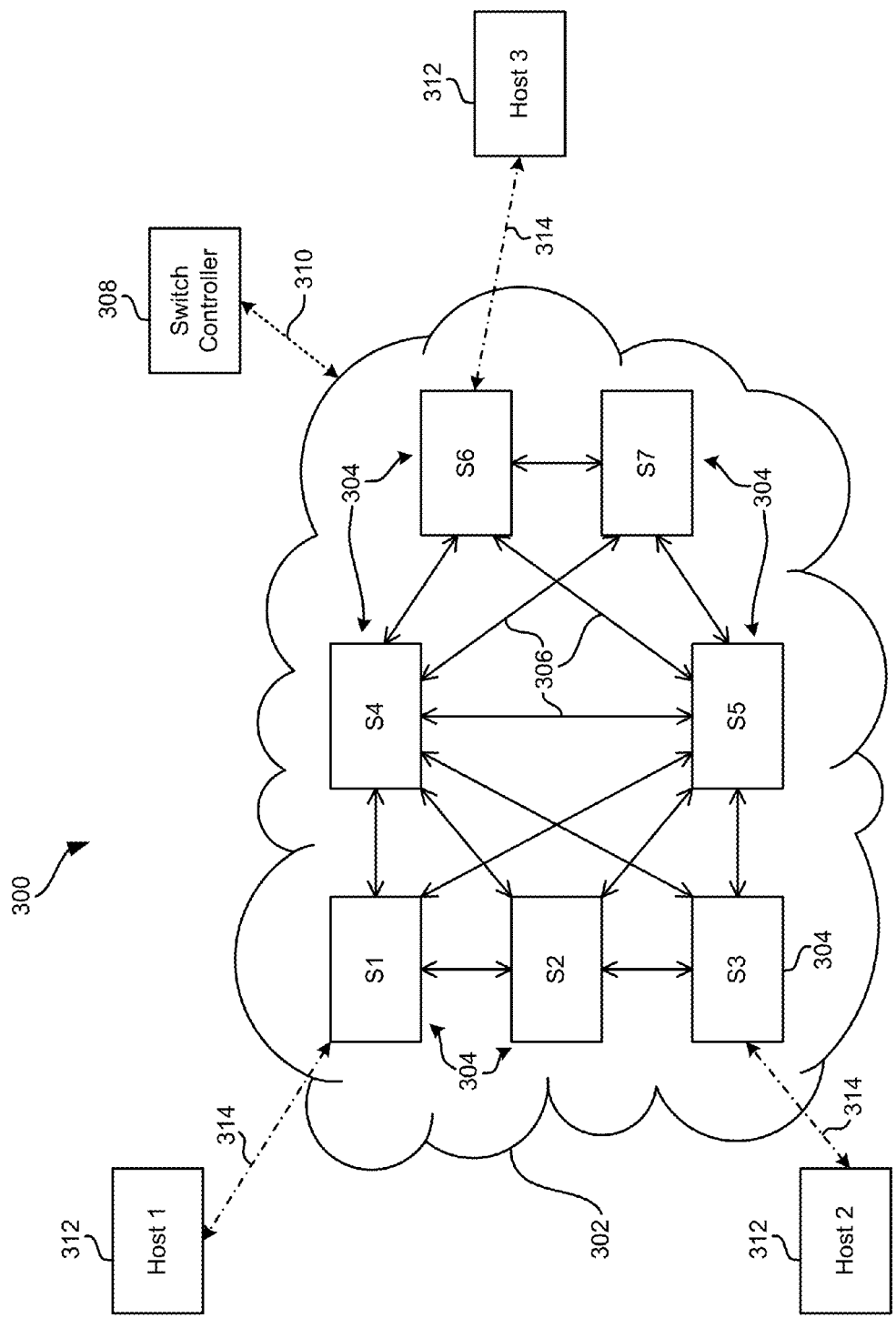
FIG. 3 shows a system, according to one embodiment.

Now referring to FIG. 3, a system 300 is shown according to one embodiment, which has a plurality of fabric switches 304 interconnected in a network fabric 302, each of the fabric switches 304 being connected to one another via connections 306. Each fabric switch 304 is connected, directly or indirectly to a switch controller 308 (as denoted by dashed line connection 310 between the switch controller 308 and the network fabric 302). The switch controller 308 is capable of receiving information from each of the fabric switches 304 and is capable of sending information and/or commands to the fabric switches 304.

According to one embodiment, the switch controller 308 may operate according to OpenFlow™ and/or SDN standards, and each fabric switch 304 may be OpenFlow and/or SDN compliant. In other embodiments, the switch controller 308 may utilize a different application capable of controlling the fabric switches 304 as would be known by one of skill in the art, such as Beacon, Jaxon, NOX, PDX, Maestro™, etc.

In addition, the network fabric 302 may be a physical and/or virtual network fabric (a network fabric which utilizes only physical devices, a network fabric which only utilizes virtual devices, and/or a network fabric which utilizes a combination of physical and virtual devices). In addition, each of the fabric switches 304 may be a physical switch, a virtual switch, or a combination thereof.

The system 300 may further comprise one or more hosts 312 connected to the network fabric 302 via one or more fabric switches 304 via connections 314. Any of the hosts 312 may be a physical host, a virtual host, or a combination thereof. The hosts may be any type of device capable of communicating with the network fabric 302, such as another network, a server, a controller, a workstation, an end station, etc. Each host 312 may include an interface for communicating with the network fabric 302 and one or more fabric switches 304 therein. Each of the hosts 312 are unaware of the physical components of the network fabric 302 and instead view the network fabric 302 as a single entity to which a connection may be made, in one approach. Of course, each host 312 is actually connected to at least one physical fabric switch 304 within the network fabric 302. The host 312 may be connected to multiple fabric switches 304 in the case of a Link Aggregation (LAG) connection.

The switch controller 308 may comprise logic adapted to analyze and configure the network fabric 302 such that there is one or more non-looping paths through the network fabric 302 between any two hosts 312 or other end stations connected to the network fabric 302. Ideally, the logic may be able to determine multiple paths through the network fabric 302, in order to provide redundancy, increased throughput, and decreased latency, among other advantages.

There are many factors to consider in determining paths through the network fabric 302. Some factors include the number of layers in the fabric, L, the number of nodes per layer, $N_L$, the switch controller's topology and connectivity graph (and whether the switch controller 308 is capable of globalizing the routing decisions), etc.

Furthermore, in order for multipathing to take place in the network fabric 302, the multipathing may take place in-order via Equal Cost Multi-Pathing (ECMP) and/or LAG hashing (and what type of hash used may be a consideration, such as an industry standard, a legacy system, etc.). In addition, the multipathing may support high performance operation via adaptive routing.

Converged Enhanced Ethernet (CEE) may also be supported by the network fabric 302, such as by using Priority Flow Control (PFC) and/or Enhanced Transmission Selection (ETS) along the complete path through the network fabric 302 in addition to Quantized Congestion Notification (QCN). Additionally, link congestion may trigger saturation tree with QCN.

In one embodiment, interface-based path representation, where a single interface to a network may be used to gain perspective on the network from a point of view of that interface. This interface-based path representation may then be used to span the network fabric 302, as shown in FIG. 3. For example, Host 1 is shown connected directly to fabric switch S1. In this example, the interface for Host 1 to the network fabric 302 may be a single physical port, a virtual port, a static LAG, a dynamic LAG, or any other suitable interface between Host 1 and fabric switch S1. Also, in this example, a global forwarding table may be created, managed, updated, and utilized by the switch controller 308 to make routing decisions, for example, once a packet is received by fabric switch S1 from Host 1 all the way until the packet is received by host 2 via S3.

In one embodiment, the switch controller 308 may be consulted anytime a routing decision is to be made for a packet received by any of the fabric switches 304 in the network fabric 302.

In another embodiment, each fabric switch 304 may have resident therein a source-routing table. In this case, the fabric switch 304 inserts the route information into each incoming packet that does not yet have source-routing information stored therein. One disadvantage of this approach is that a lot of redundancy in terms of routing information in the network is introduced, which makes routing updates cumbersome, since they must be done for each fabric switch 304 in the network fabric 302. One advantage of this approach is that legacy (i.e., non-source routing capable) devices and components (e.g., network interface cards (NICs), legacy switches, etc.) may be attached to the network fabric 302.

Figure 4:
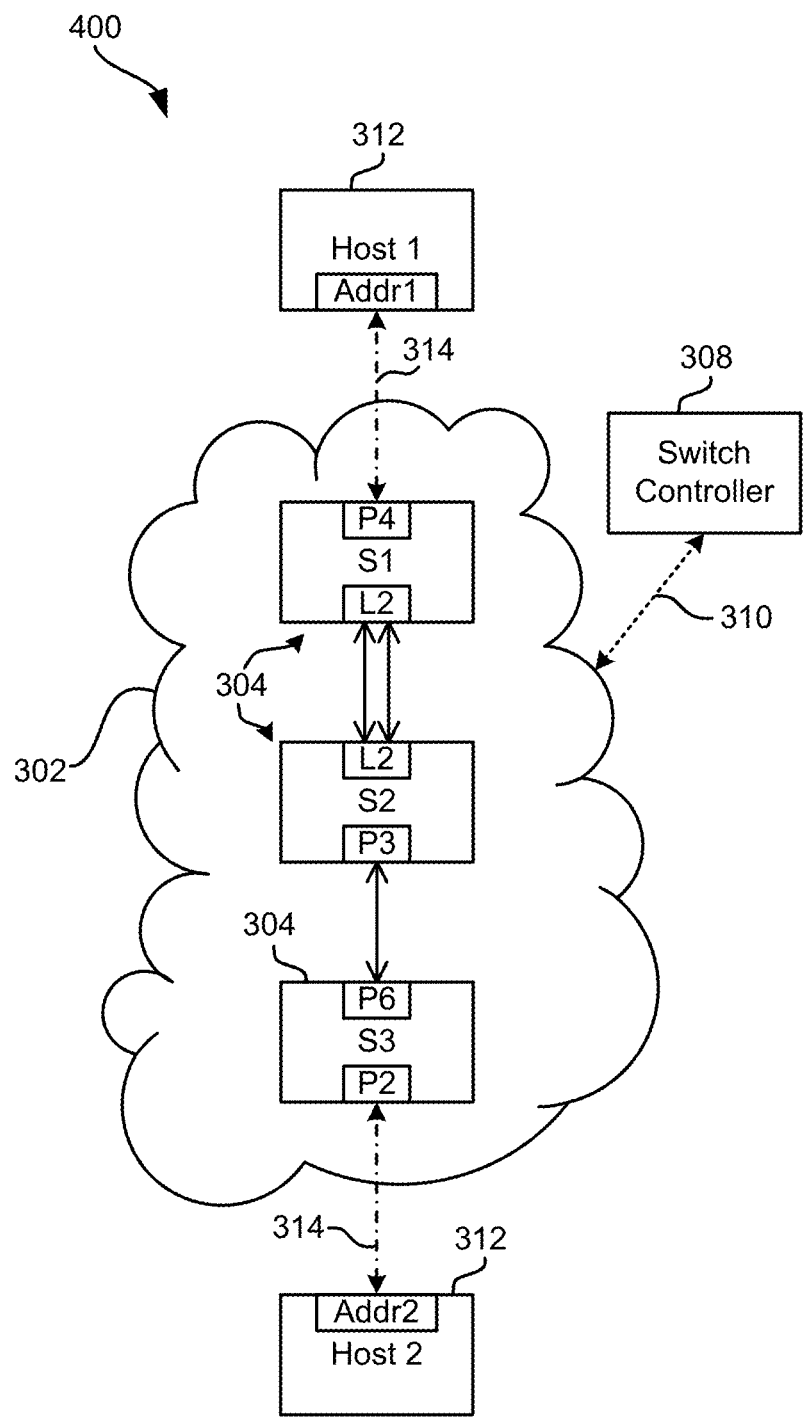
FIG. 4 shows an exemplary path through a network fabric, according to one embodiment.

Now referring to FIG. 4, a portion 400 of the network fabric 302 is shown, with one exemplary path through the network fabric 302 shown in more detail. This path is between two hosts 312, specifically Host 1 to Host 2, and includes three fabric switches 304—S1, S2, and S3. For the sake of this description, Host 1 may be assumed to have an address of Addr1 and Host 2 an address of Addr2, while it may be assumed that fabric switch S1 is connected to Host 1 via port 4 (denoted as P4), and to fabric switch S2 via a LAG (denoted as L2). Likewise, fabric switch S2 is connected to fabric switch S1 via LAG L2. Furthermore, it may be assumed that fabric switch S2 is connected to fabric switch S3 via port 3 (denoted as P3), while fabric switch S3 is connected to fabric switch S2 via port 6 (denoted as P6) and to Host 2 via port 2 (denoted as P2), as shown in FIG. 4.

The path between Host 1 and Host 2 may be represented in each fabric switch 304 in a forwarding table, according to one embodiment, which may be stored locally to each fabric switch 304, or globally by the switch controller 308 in another embodiment.

In this example, the path would be represented as follows in the forwarding table for each fabric switch, where the destination port set is identified as [device]/[port]. Furthermore, each destination port may be a physical port, a virtual port, or a combination thereof.

| Forwarding Table S1 | |
|---|---|
| Destination Address | Destination Port Set |
| Host Addr1 | S1/P4 |
| Host Addr2 | S1/L2/P5, S2/P3, S3/P2 |

| Forwarding Table S2 | |
|---|---|
| Destination Address | Destination Port Set |
| Host Addr1 | S2/L2/P4, S1/P4 |
| Host Addr2 | S2/P3, S3/P2 |

| Forwarding Table S3 | |
|---|---|
| Destination Address | Destination Port Set |
| Host Addr1 | S3/P6, S2/L2/P4, S1/P4 |
| Host Addr2 | S3/P2 |

Therefore, when a packet is received by fabric switch S1 from Host 1, and the packet is to be forwarded to Host 2, fabric switch S1 will follow a path from S1/L2/P5 to S2/P3 to S3/P2. This is because the LAG L2 is chosen and follows port 5 out of fabric switch 1 to fabric switch 2. Likewise, in the reverse direction, fabric switch 2 chooses port 4 in the LAG L2. Furthermore, this forwarding logic may take into account a hashing algorithm information exchange protocol, and in one approach, only the edge switches (switches S1 and S3 in this example) may maintain forwarding tables, and intermediate switches (switch S2 in this example) may simply follow the source route in the packet.

In another embodiment, referring again to FIG. 3, the switch controller 308 may have certain physical topology available to construct the paths through the network fabric 302. In that topology, the fabric switches 304 and physical connectivity therebetween are shown. In using the topology information, the switch controller 308 is adapted to determine the ARP entries associated with either its local ARP connectivity or general subnet distribution in the network fabric 302. So combining this information, the switch controller 308 creates these source-routing tables and may offload them to any devices capable of source routing in the network fabric 302 or connected thereto.

The switch controller 308 may offload the forwarding table information to just the fabric switches 304, or to the fabric switches 304 and the end hosts 312. In this embodiment, each end host 312 may have a forwarding table that includes source-routing information for packets being sent to other end hosts connected to the network fabric 302.

In this approach, a network interface card (NIC) of the host 312 or some other component or device may produce the source routing for each forwarded packet. In this approach, each NIC has a source-routing table that indicates the sequence of turns or hops to each known destination, and inserts the route into a frame of the packet upon injection into the fabric network 302. Still, hardware support from the fabric switches 304 is beneficial in order for this approach to function properly, because when each fabric switch 304 has the capability to inspect the frame for the presence of a source route the various fabric switches 304 in the path may then take its respective routing decision based on that source-routed information. Otherwise, when a fabric switch 304 which lacks source-routing capability encounters a packet, it will only be able to send the packet along according to some other information, without the benefit of the source-routing information which indicates a chosen route through the network. In addition, each fabric switch 304 may still have a traditional routing table to handle non-source-routed frames, regardless of whether the fabric switch 304 has the capability to handle source-routed frames.

In the case where a switch lacks the ability to handle source-routed frames, the fabric switch 304 may simply rely on a traditional routing table with which to determine a next hop and egress port. In this case, one or more devices within the path may lack the ability to handle the source-routed frames, but the packet may still be forwarded without problems until it reaches another fabric switch 304 or device in the path which is capable of handling a source-routed frame, where it will once again be handled according to the source routing. Each device in the network fabric may be a virtual device, a physical device, or a combination thereof. Furthermore, each egress port may be a physical port, a virtual port, or a combination thereof.

In any embodiment described herein, each device in the network fabric 302 and connected thereto capable of source routing may know each of the other devices to which it is connected which are source-routing capable. Accordingly, each source routing capable device is able to determine when it is forwarding a packet to a device which is not capable of source routing. In this case, the source-routing information may be stripped from the packet, and may appear as a standard packet to the receiving device.

Referring again to FIG. 4, the exemplary path through the network fabric 302 is again referenced. This path is between two hosts 312, specifically Host 1 to Host 2, and includes three fabric switches 304—S1, S2, and S3. In this approach, however, Host 1 and Host 2 have the forwarding tables, and the switches are instructed to forward packets according to the source-routed information included therein.

In this approach, the path would be represented as follows in the forwarding table for each host 312, where the destination port set is identified as [device]/[port].

| Forwarding Table Host 1 | |
|---|---|
| Destination Address | Destination Port Set |
| Host Addr1 | Internal |
| Host Addr2 | S1/L2/P5, S2/P3, S1/P2 |

| Forwarding Table Host 2 | |
|---|---|
| Destination Address | Destination Port Set |
| Host Addr1 | S3/P6, S2/L2/P4, S1/P4 |
| Host Addr2 | Internal |

The source-routing information may be encapsulated in the packets in various different ways, and may depend on any protocols and/or network types that the packet adheres to. In one embodiment, the source-routing information may be included in a header of a packet. One example of this is shown in FIG. 5A.

Referring to FIG. 5A, a frame format 500 for an exemplary packet is shown according to one embodiment. The frame format 500 includes a destination media access control address (DMAC) 502, a source MAC address (SMAC) 504, a source routing tag (SR-Tag) 506 that includes the source-routing information, a service tag (S-Tag) 508, a customer tag (C-Tag) 510, an ethertype descriptor 512, a payload 514 for the packet, and an optional frame check sequence (FCS) 516.

In one approach, the DMAC 502, SMAC 504, S-Tag 508, C-Tag 510, payload 514 and FCS 516 may behave and be utilized in the same manner as typical for any packet adhering to any of various IEEE standards; however, the ether type descriptor 512 may take into account the length of the SR-Tag 506.

Regarding the SR-Tag 506, when a switch is not source routing capable, then the SR-Tag 506 may be omitted from the packet in order for the switch to understand the information in the header of the packet. This may be performed by any device which forwards the packet to a non-source routing compliant device, such as a legacy switch. Then when the packet is received from this legacy device by another source routing compliant device, the SR-Tag 506 may be reinserted into the header and the source-routing information may be restored from this hop forward to the destination in one embodiment, or the entire source-routing information may be added to the SR-Tag 506 from the source to the destination, in an alternate embodiment.

The SR-Tag 506, in some embodiments, may include source-routing information, enforcement options, and hop count information.

A Tag Protocol Identifier (TPID), such as the TPID 520 shown in FIG. 5B according to one embodiment, may be used to denote the SR-Tag 506. The TPID 520 to denote a SR-Tag may have the code 0xD2D2, but is not so constrained, as any available string may be used to denote an SR-Tag. The SR-Tag 506 may be formatted to include a series of strings, each string having a predetermined length. In this example, the strings are 16 bits long, but any length may be used, such as 8 bits, 24 bits, 32 bits, etc. The first string may be designated for Enforcement Options 522 and the Hop Count 524, with each string including half the string length (8 bits each) or some other division.

The Enforcement Options 522 may be used to indicate any enforcement criteria for a particular packet. For example, if the switch has a forwarding table which is inconsistent with a next hop stipulated in the source-routing information, then the switch may be directed to overwrite its own forwarding table with the source-routing information or the source-routing information may be rewritten based on the switch's local forwarding table. This decision may be indicated in the Enforcement Options 522. These Enforcement Options 522 also may dictate whether the source-routing information is strictly followed or if it may be bypassed. Then, other traffic management options may be present, such as which of various available ports to choose to egress the packet (such as in a LAG or some other suitable arrangement). This is possible because it is a logical interface. A logical interface might come up with more than one physical port to choose from. The Enforcement Options 522 may indicate that a port with lowest latency should be chosen, or a port with the highest latency but more reliability, or some other traffic management decision that is understood by intermediate switches. Most of the instructions that may be stored in the Enforcement Options 522 may be related to reliability and/or traffic management. Some of these options may even allow filtering or not filtering based on the SR-Tags because the SR-Tags are a necessary component in order to filter, and basically the options might indicate that the SR-Tag is to be retained no matter what. In another approach, the switch may use the SR-Tag if it understands it, or it may discard the SR-Tag if it does not.

The Hop Count 524 is used to denote which hop the packet is currently at. After the initial string having the Enforcement Options 522 and the Hop Count 524, a series of Bridge IDs 526 related to Logical Port IDs 528 and Options 530 thereof may be listed, one for each hop, shown as hop 0, hop 1, hop 2, . . . , hop N. The number of Bridge IDs 526 and Logical Port IDs 528 and Options 530 may depend on the number of hops in the designated path, e.g., N. The Hop Count 524 indicates the current hop in the path where the packet is supposed to be, e.g., a number between 0 and N, either beginning at N or 0. If the packet is not at the indicated hop, then corrective action may be taken by the switch to correct any issues with the Hop Count 524 and/or designated path.

Each set of Bridge ID 526 and Logical Port ID 528 and Options 530 thereof may be 16 bits in length, with the Bridge IDs 526 being 16 bits, the Logical Port ID 528 being 12 bits, and the Options 530 being 4 bits. Of course, any other length may be used for these fields, as would be understood by one of skill in the art.

Figure 6:
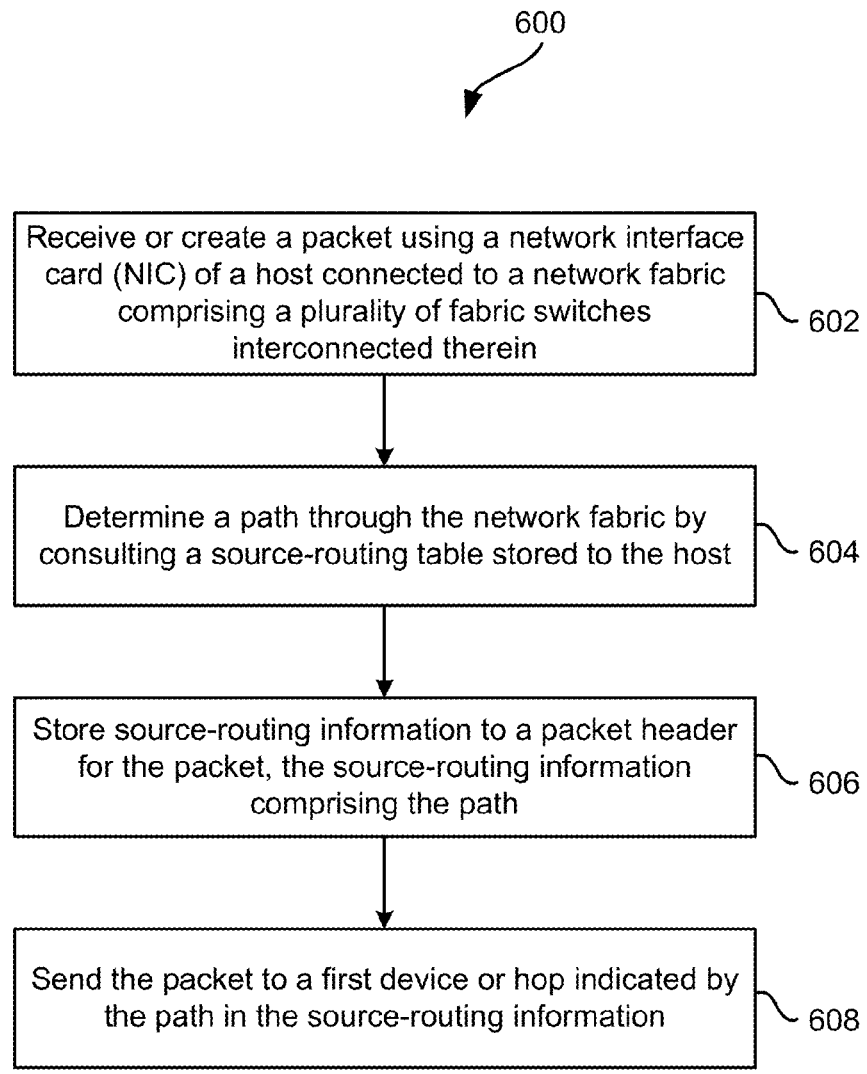
FIG. 6 is a flowchart of a method for source routing packets, according to one embodiment.

Now referring to FIG. 6, a flowchart of a method 600 for source routing packets is shown, according to one embodiment. The method 600 may be performed in accordance with the present invention in any of the environments depicted in FIGS. 1-5B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a fabric switch, an end station, a processor (such as an ASIC, a switching ASIC, a CPU, etc.) embodied in a computer, a switch controller, a host connected to a network fabric having a plurality of fabric switches interconnected therein, etc.

As shown in FIG. 6, method 600 may initiate with operation 602, where a packet is received or created using a network interface card (NIC) of a host connected to a network fabric. The NIC in this method is source routing capable. The network fabric includes a plurality of fabric switches interconnected therein, each fabric switch possibly being source routing capable.

According to one embodiment, the switch controller may be adapted to operate according to OpenFlow standards, and the NIC or host may be OpenFlow compliant. In this approach, source-routing table details and rules may be received from the OpenFlow Controller, as a way of programming which information and how the information is stored in the source-routing table.

In operation 604, a path through the network fabric is determined by consulting a source-routing table stored to the host. The path may be chosen from many different available paths between the host and the detonation address of the packet. In one embodiment, traffic may be load balanced between the destination address and the host by changing which path is selected for each new packet, stream of packets, flow, etc.

In a further embodiment, source-routing information may be received from a switch controller, and the source-routing information may be stored to the source-routing table, thereby allowing the host to send packets to any known destination in the network fabric without the use of a traditional look-up table.

In operation 606, source-routing information is stored to a packet header for the packet, the source-routing information comprising the path.

In a further embodiment, the source-routing information may be stored in a SR-Tag in the packet header. The SR-Tag may comprise, as described in more detail previously, an enforcement options field, a hop count indicator field for indicating a current device or hop in the path, and the source-routing information for the path, comprising a bridge indicator associated with a logical port indicator and options thereof for each device or hop in the path.

In operation 608, the packet is sent to a first device or hop indicated by the path in the source-routing information. This operation may be performed without the use of a look-up table. The first device or hop may be part of the path stored in the packet header which indicates the path through the network fabric.

In more embodiments, referring again to FIG. 6, any or all operations of method 600 may be implemented in a system, a fabric switch, a device, a network, a host, a processor, and/or a computer program product.

Figure 7:
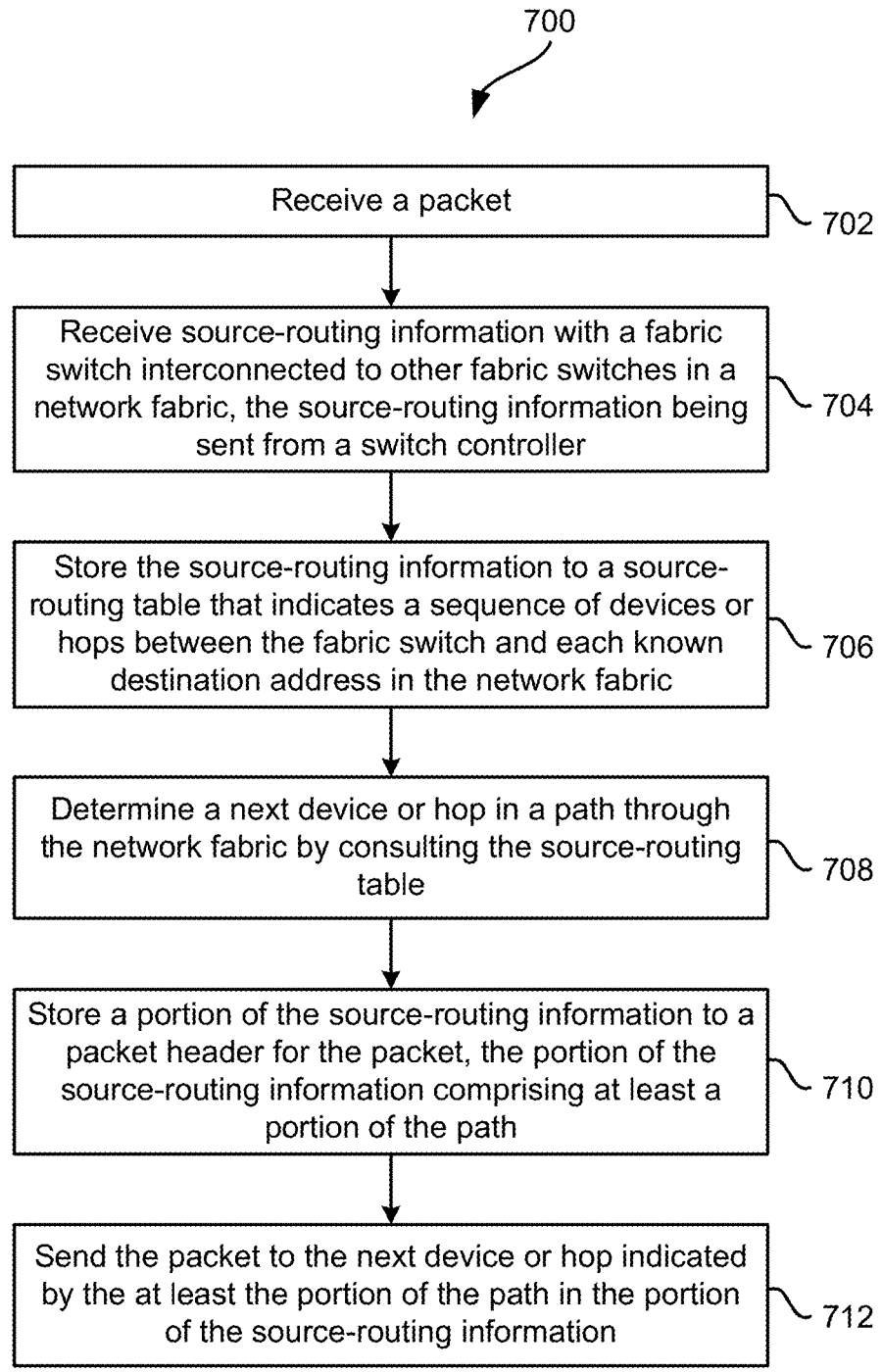
FIG. 7 is a flowchart of a method for source routing packets, according to one embodiment.

Now referring to FIG. 7, another flowchart of method 700 for source routing packets is shown, according to one embodiment. The method 700 may be performed in accordance with the present invention in any of the environments depicted in FIGS. 1-5B, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a fabric switch, an end station, a processor (such as an ASIC, a switching ASIC, a CPU, etc.) embodied in a computer, a switch controller, a host connected to a network fabric having a plurality of fabric switches interconnected therein, etc.

As shown in FIG. 7, method 700 may initiate with operation 702, where a packet is received, such as by a fabric switch in a network fabric comprising a plurality of interconnected fabric switches. In addition, one or more hosts may be connected to the network fabric. The fabric switch may be connected, directly or indirectly, to a switch controller for controlling certain functions thereof.

According to one embodiment, the switch controller may be adapted to operate according to OpenFlow standards, and the fabric switch may be OpenFlow compliant.

In operation 704, source-routing information may be received with a fabric switch, the source-routing information being sent from the switch controller.

In operation 706, the source-routing information is stored to a source-routing table that indicates a sequence of devices or hops between the fabric switch and each known destination address in the network fabric.

In operation 708, a next device or hop in a path through the network fabric is determined by consulting the source-routing table. This operation may be performed without the use of a look-up table, in one approach.

In operation 710, a portion of the source-routing information is stored to a packet header for the packet, the portion of the source-routing information comprising at least a portion of the path.

In one embodiment, the portion of the source-routing information may be stored in a SR-Tag, the SR-Tag comprising an enforcement options field, a hop count indicator field for indicating a current device or hop in the path, and the portion of the source-routing information for the at least the portion of the path. The portion of the source-routing information comprises a bridge indicator associated with a logical port indicator and options thereof for each device or hop in the path.

In operation 712, the packet is sent to the next device or hop indicated by the at least the portion of the path in the portion of the source-routing information.

In more embodiments, referring again to FIG. 7, any or all operations of method 700 may be implemented in a system, a fabric switch, a device, a network, a host, a processor, and/or a computer program product.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a processor and logic integrated with and/or executable by the processor, the logic being configured to:
receive a packet via a network fabric, the network fabric comprising a plurality of interconnected fabric switches;
determine a path through the network fabric by consulting a source-routing table that has at least one path stored therein, the at least one path comprising:
a destination address corresponding to a first host connected to the network fabric;
a destination address corresponding to a second host connected to the network fabric; and
a destination port set representing each device or hop between the first host and the second host along the at least one path, each destination port comprising a device identifier and an egress port identifier for the device or hop in the at least one path;
store source-routing information from the source-routing table to a packet header for the packet, the source-routing information comprising the path; and
send the packet according to an indication in the source-routing information.

2. The system as recited in claim 1, wherein the logic is further configured to:
receive source-routing information from a switch controller that is specific to a location of the system in the network fabric; and
store the source-routing information to the source-routing table.

3. The system as recited in claim 2, wherein the processor is configured to operate according to OpenFlow standards.

4. The system as recited in claim 3, wherein the logic is further configured to receive rules from the switch controller via OpenFlow, the rules dictating which information is stored in the source-routing table and how the information is stored in the source-routing table.

5. The system as recited in claim 1, wherein the logic configured to store the source-routing information to the packet header is further configured to store the source-routing information in a source routing tag (SR-Tag), the SR-Tag comprising:
an enforcement options field, the enforcement options field indicating whether the source-routing information is strictly followed or bypassed;
a hop count indicator field that indicates a current device or hop in the path; and
the source-routing information for the path, comprising a bridge indicator associated with a logical port indicator and options thereof for each device or hop in the path.

6. The system as recited in claim 1, wherein destination ports included in each destination port set are ordered successively from the first host to the second host, or vice versa.

7. The system as recited in claim 1, wherein the indication indicates a first device or a hop along the at least one path.

8. A computer program product, the computer program product comprising a computer readable storage medium having program instructions embodied therewith, the embodied program instructions readable/executable by a processor to cause the processor to:
receive, by the processor, a packet via a network fabric, the network fabric comprising a plurality of interconnected fabric switches;
determine, by the processor, a path through the network fabric by consulting a source-routing table that has at least one path stored therein, the at least one path comprising:
a destination address corresponding to a first host connected to the network fabric;
a destination address corresponding to a second host connected to the network fabric; and
a destination port set representing each device or hop between the first host and the second host along the at least one path, each destination port comprising a device identifier and an egress port identifier for the device or hop in the at least one path;
store, by the processor, source-routing information from the source-routing table to a packet header for the packet, the source-routing information comprising the path; and
send, by the processor, the packet according to an indication in the source-routing information.

9. The computer program product as recited in claim 8, wherein the embodied program instructions are further readable/executable by the processor to:
receive, by the processor, source-routing information from a switch controller that is specific to a location of the processor in the network fabric; and
store, by the processor, the source-routing information to the source-routing table.

10. The computer program product as recited in claim 9, wherein the processor is configured to operate according to OpenFlow standards.

11. The computer program product as recited in claim 10, wherein the embodied program instructions are further readable/executable by the processor to receive, by the processor, rules from the switch controller via OpenFlow, the rules dictating which information is stored in the source-routing table and how the information is stored in the source-routing table.

12. The computer program product as recited in claim 8, wherein the embodied program instructions readable/executable to store, by the processor, the source-routing information to the packet header are further readable/executable by the processor to store the source-routing information in a source routing tag (SR-Tag), the SR-Tag comprising:

an enforcement options field, the enforcement options field indicating whether the source-routing information is strictly followed or bypassed;

a hop count indicator field that indicates a current device or hop in the path; and the source-routing information for the path, comprising a bridge indicator associated with a logical port indicator and options thereof for each device or hop in the path.

13. The computer program product as recited in claim 8, wherein destination ports included in each destination port set are ordered successively from the first host to the second host, or vice versa.

14. The computer program product as recited in claim 8, wherein the indication indicates a first device or a hop along the at least one path.

15. The system as recited in claim 1, further comprising a network interface card (NIC) that includes the processor that executes the logic.

16. The system as recited in claim 2, wherein the logic is further configured to:

receive modified source-routing information from the switch controller; and edit the source-routing table with the modified source-routing information.

17. The computer program product as recited in claim 9, wherein the embodied program instructions are further readable/executable by the processor to:

receive, by the processor, modified source-routing information from the switch controller; and edit, by the processor, the source-routing table with the modified source-routing information.

* * * * *